(12) United States Patent
Cai

(10) Patent No.: US 11,580,668 B2
(45) Date of Patent: Feb. 14, 2023

(54) AUTOMATIC CORRECTION METHOD FOR ONBOARD CAMERA AND ONBOARD CAMERA DEVICE

(71) Applicant: VIA Technologies, Inc., Taipei (TW)

(72) Inventor: Meng-Lun Cai, Taipei (TW)

(73) Assignee: VIA TECHNOLOGIES, INC., Taipei (TW)

(*) Notice: Subject to any disclaimer, the term of this patent is extended or adjusted under 35 U.S.C. 154(b) by 312 days.

(21) Appl. No.: 17/084,865

(22) Filed: Oct. 30, 2020

(65) Prior Publication Data
US 2021/0383570 A1    Dec. 9, 2021

(51) Int. Cl.
*G06T 7/80*      (2017.01)
*G06F 17/16*    (2006.01)
*G06V 20/56*    (2022.01)

(52) U.S. Cl.
CPC ............... *G06T 7/80* (2017.01); *G06F 17/16* (2013.01); *G06V 20/588* (2022.01)

(58) Field of Classification Search
None
See application file for complete search history.

(56) References Cited

U.S. PATENT DOCUMENTS

2014/0139674 A1* 5/2014 Aoki .................. G06T 7/85
348/148

FOREIGN PATENT DOCUMENTS

| CN | 206623754 U | 11/2017 |
| CN | 110211176 A | 9/2019 |

* cited by examiner

*Primary Examiner* — Elmito Breval
(74) *Attorney, Agent, or Firm* — McClure, Qualey & Rodack, LLP

(57) ABSTRACT

There is provided an automatic correction method for an onboard camera and an onboard camera device. The automatic correction method includes the following steps: obtaining a lane image with the onboard camera and a current extrinsic parameter matrix, and identifying two lane lines in the lane image; converting the lane image into a top-view lane image, and obtaining two projected lane lines in the top-view lane image for the two lane lines; calculating a plurality of correction parameter matrices corresponding to the current extrinsic parameter matrix according to the two projected lane lines; and correcting the current extrinsic parameter matrix according to the plurality of correction parameter matrices. This can be applied in situations where the vehicle is stationary or travelling for automatic correction on the extrinsic parameter matrix of the onboard camera.

20 Claims, 5 Drawing Sheets

AUTOMATIC CORRECTION METHOD FOR ONBOARD CAMERA AND ONBOARD CAMERA DEVICE

CROSS-REFERENCE TO RELATED APPLICATIONS

This application claims the priority benefit of Taiwan application serial no. 109119151, filed on Jun. 8, 2020. The entirety of the above-mentioned patent application is hereby incorporated by reference herein and made a part of this specification.

TECHNICAL FIELD

The present disclosure relates to a camera and a correction method, in particular to an automatic correction method for onboard camera and an onboard camera device.

BACKGROUND

For an Advanced Driver Assistance System (ADAS), it is required to obtain lane images from onboard camera and generate control information related to assisting driving—by analyzing or recognizing the lane images. However, common onboard cameras are corrected with a manner of static adjustments. That is, if the onboard camera mounted on a vehicle is subject to any situation like a displacement, a change of the road environment or a setting error while the vehicle is travelling, the onboard camera then cannot instantly provide a valid lane image for the analysis and recognition, resulting in fails of the ADAS. To this end, a solution of several embodiments will be provided as below.

SUMMARY

The present disclosure provides an automatic correction method for onboard camera and an onboard camera device, wherein the onboard camera can be automatically corrected by adjusting an extrinsic parameter matrix.

The automatic correction method for onboard camera according to the present disclosure includes the following steps: obtaining a lane image with the onboard camera and a current extrinsic parameter matrix, and identifying two lane lines in the lane image; converting the lane image into a top-view lane image, and obtaining two projected lane lines in the top-view lane image for the two lane lines; calculating a plurality of correction parameter matrices corresponding to the current extrinsic parameter matrix according to the two projected lane lines; and correcting the current extrinsic parameter matrix according to the plurality of correction parameter matrices.

The onboard camera device according to the present disclosure comprises an onboard camera, a processor and a memory. The onboard camera is configured to obtain a lane image according to a current extrinsic parameter matrix. The processor is coupled to the onboard camera. The memory is coupled to the processor. The memory is configured to store a plurality of modules for reading and execution by the processor. The processor executes an image processing module to identify two lane lines in the lane image, and to convert the lane image into a top-view lane image, for obtaining two projected lane lines in the top-view lane image for the two lane lines. The processor executes an image correction module to calculate a plurality of correction parameter matrices corresponding to the current extrinsic parameter matrix according to the two projected lane lines, and to correct the current extrinsic parameter matrix according to the plurality of correction parameter matrices.

On this basis, the automatic correction method for onboard camera and the onboard camera device according to the present disclosure may generate a plurality of correction parameter matrices with regard to the two lane lines in the lane image, and correct the current extrinsic parameter matrix according to the plurality of correction parameter matrices, so as to adjust the onboard camera automatically.

The above features and advantages of the present disclosure will be apparent from the following embodiments and detailed descriptions in conjunction with the accompanying drawings.

DETAILED DESCRIPTION

To make the content of the present disclosure more comprehensible, the following embodiments are provided as examples by which the present disclosure can be implemented. In addition, wherever possible, elements/components/steps with the same numerical references refer to similar or same parts.

Figure 1:
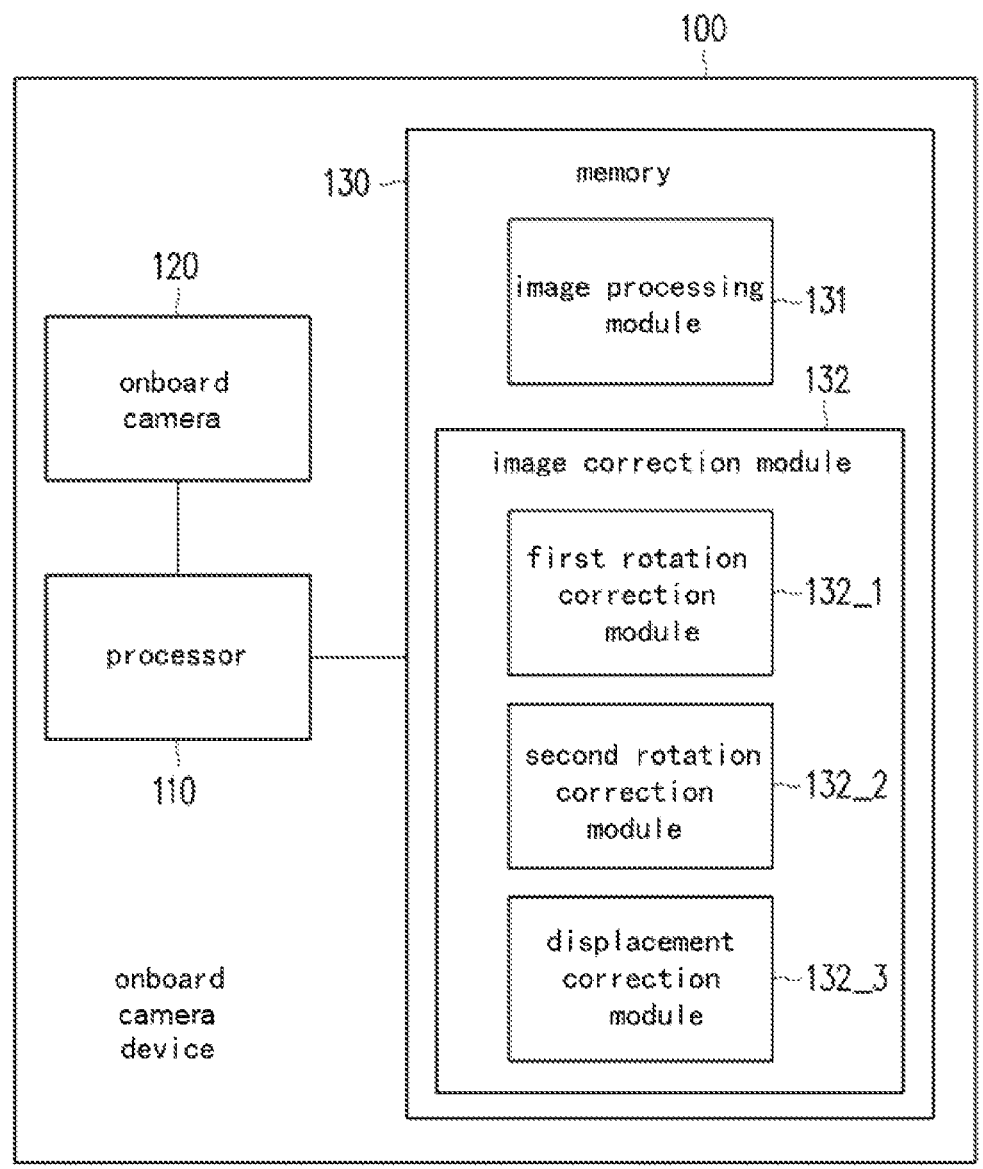
FIG. 1 is a block diagram of an onboard camera device according to an embodiment of the present disclosure.

FIG. 1 is a block diagram of an onboard camera device according to an embodiment of the present disclosure. Referring to FIG. 1, the onboard camera device 100 comprises a processor 110, an onboard camera 120 and a memory 130. The processor 110 is coupled to the onboard camera 120 and the memory 130. In the present embodiment, the memory 130 stores a plurality of modules for reading and execution by the processor 110. The memory 130 may store an image processing module 131 and an image correction module 132. The image correction module 132 may include a first rotation correction module 132_1, a second rotation correction module 132_2 and a displacement correction module 132_3. In particular, a relationship between a camera coordinate ([x',y',z']) by the onboard camera 120 and a world coordinate ([X,Y,Z]) is given in the following Equation (1), and a relationship between an imaging frame coordinate ([u, v]) of the onboard camera 120 and the camera coordinate ($[x',y',z']$) is given in the following Equation (2). $M_{int}$ is an intrinsic parameter matrix, and $M_{ext}$ is an initial extrinsic parameter matrix. In the present embodiment, the initial extrinsic parameter matrix and the intrinsic parameter matrix are pre-established and stored in the memory 130. In the present embodiment, the processor 110 may read and execute respective modules in the memory 130 to calculate a plurality of correction parameter matrices for adjusting the initial extrinsic parameter matrix, so as to correct the onboard camera 120.

$$\begin{bmatrix} x' \\ y' \\ z' \\ 1 \end{bmatrix} = M_{ext} \begin{bmatrix} X \\ Y \\ Z \\ 1 \end{bmatrix}, M_{ext} = \begin{bmatrix} r_0 & r_1 & r_2 & t_0 \\ r_3 & r_4 & r_5 & t_1 \\ r_6 & r_7 & r_8 & t_2 \\ 0 & 0 & 0 & 1 \end{bmatrix} \quad \text{Equation (1)}$$

$$\begin{bmatrix} u \\ v \\ 1 \end{bmatrix} = M_{int} \begin{bmatrix} \frac{x'}{z'} \\ \frac{y'}{z'} \\ 1 \end{bmatrix}, M_{int} = \begin{bmatrix} f_x & 0 & c_x \\ 0 & f_y & c_y \\ 0 & 0 & 1 \end{bmatrix} \quad \text{Equation (2)}$$

In the present application, the processor 110 is of, for example, a central processing unit (CPU), other programmable general or dedicated microprocessors, a digital signal processor (DSP), a programmable controller, an application specific integrated circuit (ASIC), a programmable logic device (PLD), or other similar devices, or a combination of them. In the present embodiment, the memory 130 is of, for example, any type of stationary or mobile random access memory (RAM), read-only memory (ROM), flash memory, or similar components, or a combination of them. In the present embodiment, the memory 130 is configured to record images provided by the onboard camera 120 and to pre-store a plurality of modules for reading and execution by the processor 110.

In the present embodiment, the onboard camera device 100 may be a vehicle system to be mounted in a vehicle by a user, and the onboard camera 120 is provided in or outside the vehicle. After the image captured by the onboard camera 120 has been corrected, the processor may further provide it to the vehicle system of the vehicle for relative assisting operations. In an embodiment, the onboard camera device 100 may also be a mobile device like a smartphone. The processor 110 may be for example a CPU of the mobile device. The memory 130 may be for example a storage unit of the mobile device. The onboard camera 120 may be for example an imaging camera of the mobile device. The user may set the mobile device on a vehicle as a driving assistance system.

Figure 2:
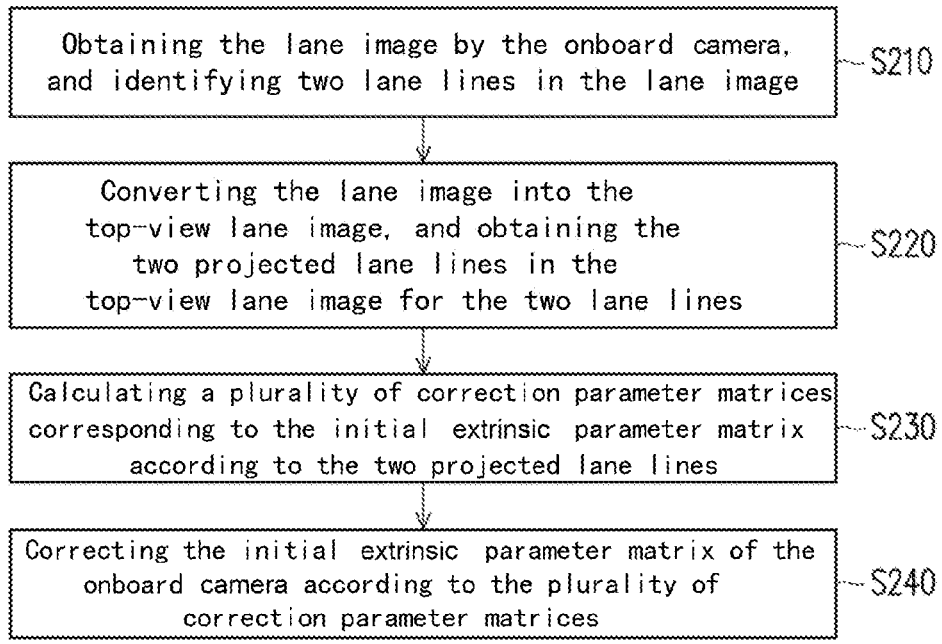
FIG. 2 is a flow chart of an automatic correction method for onboard camera according to an embodiment of the present disclosure.
Figure 3A:
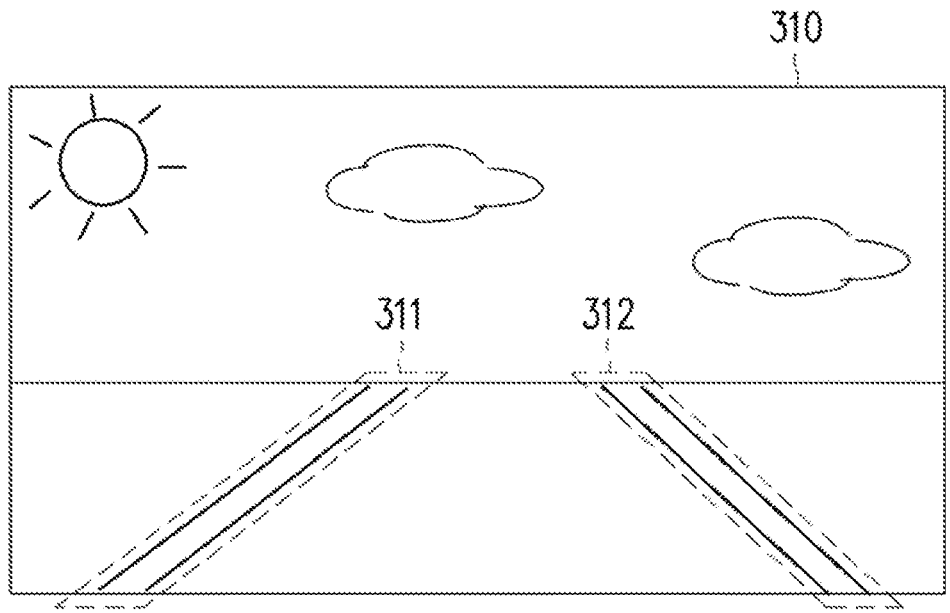
FIG. 3A is a schematic diagram of a lane image according to an embodiment of the present disclosure.
Figure 3B:
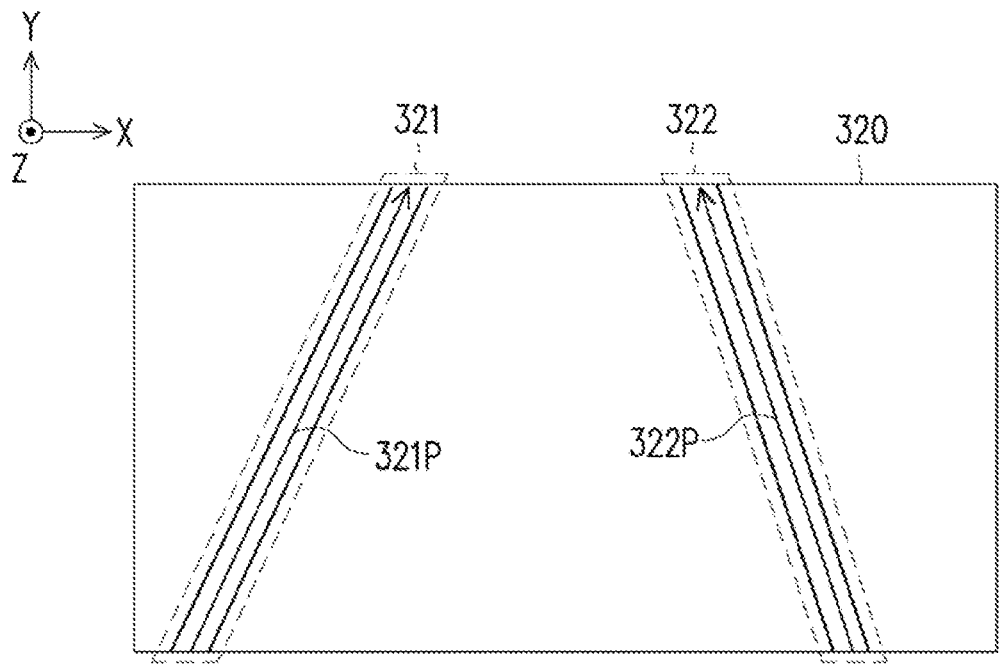
FIG. 3B is a schematic diagram of a top-view lane image according to an embodiment of the present disclosure.

FIG. 2 is a flow chart of an automatic correction method for onboard camera according to an embodiment of the present disclosure. FIG. 3A is a schematic diagram of a lane image according to an embodiment of the present disclosure. FIG. 3B is a schematic diagram of a top-view lane image according to an embodiment of the present disclosure. Referring to FIG. 1 to FIG. 3B, the onboard camera device 100 may perform the steps S210 to S240 of the embodiment in FIG. 2 for realizing an automatic correction on the onboard camera, which will be described hereafter with the aid of the lane image 310 in FIG. 3A and the top-view lane image 320 in FIG. 3B. At step S210, the onboard camera device 100 may obtain the lane image 310 as shown in FIG. 3A by the onboard camera 120 as well as the intrinsic parameter matrix and the initial extrinsic parameter matrix; and the processor 110 may execute the image processing module 131 to identify two lane lines 311 and 312 in the lane image 310. Various existing methods for lane line identification may be used by one skilled in the art and will not be repeated herein. At step S220, the processor 110 may execute the image processing module 131 to convert the lane image 310 into the top-view lane image 320 as shown in FIG. 3B, and to obtain two projected vectors 321P and 322P of the two projected lane lines 321 and 322 in the top-view lane image 320. In addition, please note that in the present disclosure, the lane image 310 in FIG. 3A is described by the imaging frame coordinate, and the top-view lane image 320 in FIG. 3B is described by the world coordinate; therefore, the two projected lane lines 321 and 322 may be deemed as extending in a horizontal plane along the X and Y-axes, and the Z-axis is of a perpendicular direction.

For example, the image processing module 131 may convert positions of multiple pixels in the lane image 310 obtained by the onboard camera 120 into corresponding positions in the top-view lane image 320 with a pre-established conversion matrix. For this, for example, a first image containing a reference object (e.g., positioning grids or patterns drawn on the ground) may be captured in advance by the onboard camera 120, and a second image in top view containing the same reference object may be captured by another independent camera disposed above the reference object. Then the image processing module 131 may acquire positions of multiple pixels of the reference object in the first image as target positions, and acquire positions of multiple corresponding pixels of the same reference object in the second image as source positions, to accordingly solve multiple conversion parameters in the conversion matrix. However, the method for converting the field of view of images in the present disclosure is not limited to this. In an embodiment, the onboard camera device 100 may include multiple cameras at different locations, and images captured by the multiple cameras may be converted using the same or different conversion matrices in correspondence to the angle and camera parameters of the respective camera. In addition, in another embodiment, the onboard camera device 100 may also, for example, establish a mapping table with a mapping from pixels of each lane image to pixels of the corresponding top-view lane image in advance based on the above conversion matrices, and then perform a conversion by looking-up the table. Moreover, in a further embodiment, the image processing module 131 may convert the lane image 310 captured by the onboard camera 120 to the top-view lane image 320 after performing a fish-eye correction on the lane image 310.

Referring to FIG. 2 again, at step S230, the processor 110 may execute an image correction module 132, to calculate, based on the above two projected lane lines 321 and 322, a plurality of correction parameter matrices corresponding to the initial extrinsic parameter matrix. At the step S240, the processor 110 may execute an image correction module 132, to correct the initial extrinsic parameter matrix of the onboard camera 120 according to the plurality of correction parameter matrices. Thus by the automatic correction method of the present embodiment, the onboard camera 120 can be corrected effectively. And the matrix calculations with regard to steps S230 and S240 will be described with details in the following embodiment of FIG. 4.

Figure 4:
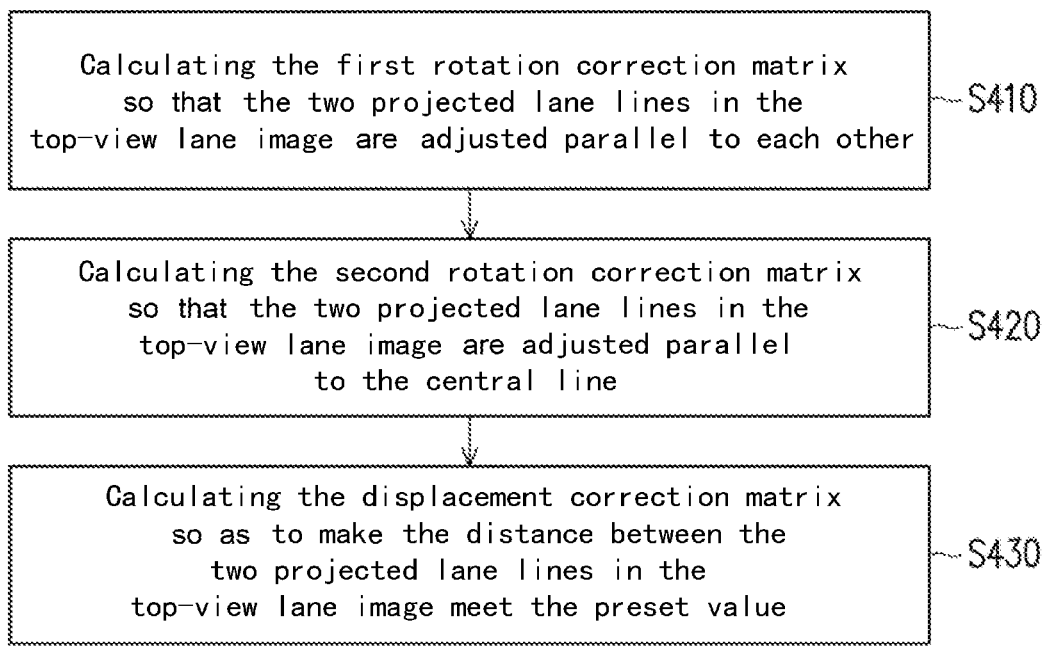
FIG. 4 is a flow chart of calculating a plurality of correction matrices according to an embodiment of the present disclosure.
Figure 5A:
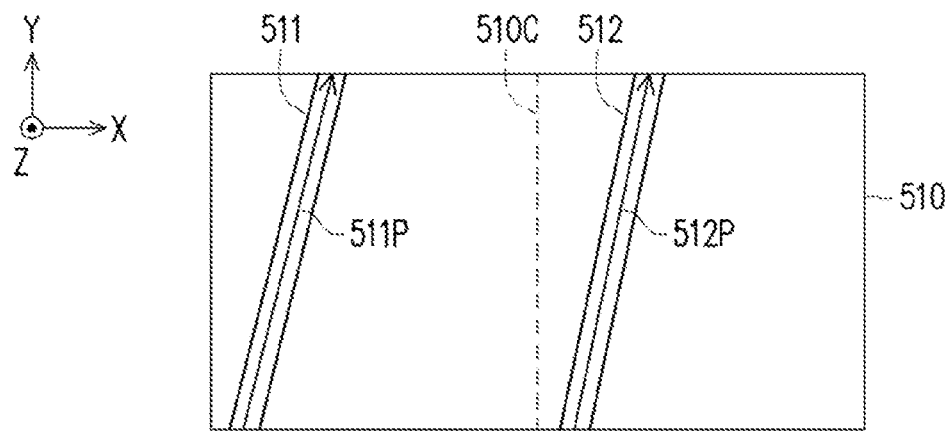
FIG. 5A is a schematic diagram of a top-view lane image that has been corrected by a first rotation correction matrix according to an embodiment of the present disclosure.
Figure 5B:
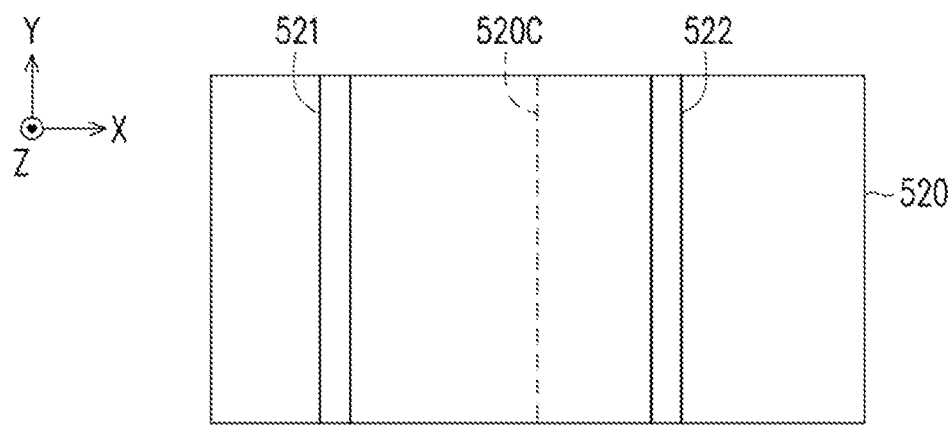
FIG. 5B is a schematic diagram of a top-view lane image that has been corrected by a second rotation correction matrix according to an embodiment of the present disclosure.
Figure 5C:
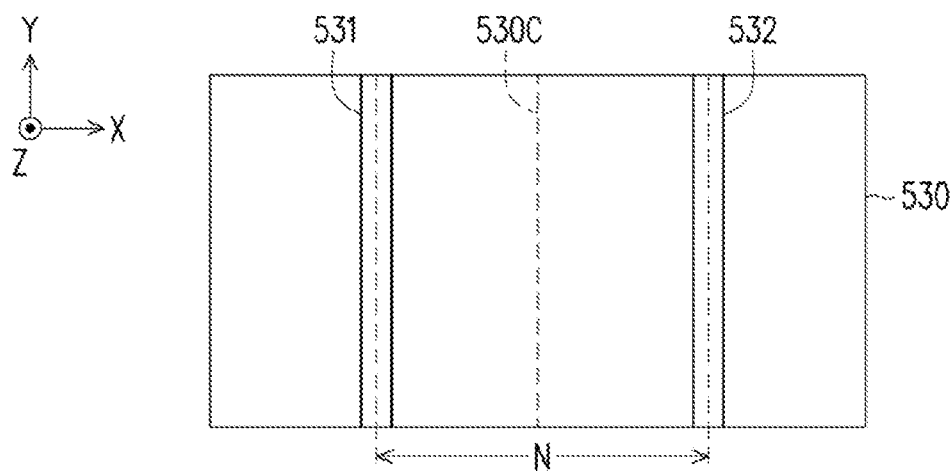
FIG. 5C is a schematic diagram of a top-view lane image that has been corrected by a displacement correction matrix according to an embodiment of the present disclosure.

FIG. 4 is a flow chart of calculating a plurality of correction matrices according to an embodiment of the present disclosure. FIG. 5A is a schematic diagram of a top-view lane image that has been corrected by a first rotation correction matrix according to an embodiment of the present disclosure. FIG. 5B is a schematic diagram of a top-view lane image that has been corrected by a second rotation correction matrix according to an embodiment of the present disclosure. FIG. 5C is a schematic diagram of a top-view lane image that has been corrected by a displacement correction matrix according to an embodiment of the present disclosure. Referring to FIG. 3A to FIG. 5C, the onboard camera device 100 may perform steps S410 to S430 in the embodiment of FIG. 4 to realize the automatic correction on the onboard camera; this will also be described with the aid of the correction results for the top-view lane image at the respective steps in FIG. 5A to FIG. 5B. Also, the steps S410 to S430 in the present embodiment are further explanations for the calculation of a plurality of correction parameter matrices in the above step S230 in FIG. 2.

At step S410, the processor 110 may calculate a first rotation correction matrix so that the above-mentioned two projected lane lines 321 and 322 in the top-view lane image 320 in FIG. 3B are adjusted parallel to each other. In the present embodiment, the first rotation correction matrix may be the following matrix in Equation (3), where $r_0^A$ to $r_8^A$ are rotation parameters and $t_0^A$ to $t_2^A$ are displacement parameters.

$$\begin{bmatrix} r_0^A & r_1^A & r_2^A & t_0^A \\ r_3^A & r_4^A & r_5^A & t_1^A \\ r_6^A & r_7^A & r_8^A & t_2^A \\ 0 & 0 & 0 & 1 \end{bmatrix} \quad \text{Equation (3)}$$

In the present embodiment, the processor 110 may be configured to perform iterative operations in correspondence to an optimization function for the first rotation correction matrix, and the target of the optimization function is to minimize an angle between the two projected vectors 321P and 322P (i.e., making them parallel to each other) of the two projected lane lines 321 and 322. For example, the processor 110 may establish a minimization equation as the following Equation (4), where va and vb are unit vectors for the two projected vectors 321P and 322P of the two projected lane lines 321 and 322. The processor 110 adjusts the initial extrinsic parameter matrix $M_{ext}$ in the above Equation (1) using the above Equation (3), so as to establish the following Equation (5).

$$\min(1.0 - (va \cdot vb))^2 \quad \text{Equation (4)}$$

$$\begin{bmatrix} x' \\ y' \\ z' \\ 1 \end{bmatrix} = \begin{bmatrix} r_0^A & r_1^A & r_2^A & t_0^A \\ r_3^A & r_4^A & r_5^A & t_1^A \\ r_6^A & r_7^A & r_8^A & t_2^A \\ 0 & 0 & 0 & 1 \end{bmatrix} \begin{bmatrix} r_0 & r_1 & r_2 & t_0 \\ r_3 & r_4 & r_5 & t_1 \\ r_6 & r_7 & r_8 & t_2 \\ 0 & 0 & 0 & 1 \end{bmatrix} \begin{bmatrix} X \\ Y \\ Z \\ 1 \end{bmatrix} \quad \text{Equation (5)}$$

In the present embodiment, as the purpose of the first rotation correction matrix is to adjust physical quantities of rotation, the displacement parameters $t_0^A$ to $t_2^A$ are all zero. With the coordinates of respective two terminal points of the two lane lines 311 and 312 known in FIG. 3A and the Equations (2), (4) and (5), the processor 110 may calculate the rotation parameters $r_0^A$ to $r_8^A$ iteratively. In an embodiment, the processor 110 may use existing mathematical optimization software with the least square method, such as the Ceres Solver, for the iterative calculations; but the present disclosure is not limited to this. The processor 110 may also obtain the rotation parameters with other numerical methods. By this, after the top-view lane image 320 in FIG. 3B has been corrected by the first rotation correction matrix with the calculated rotation parameters, a top-view lane image 510 as shown in FIG. 5A may be rendered, where the two projected lane lines 511 and 512 in the top-view lane image 510 are parallel (but may not be parallel to the central line 510C).

At step S420, the processor 110 may calculate a second rotation correction matrix so that the above-mentioned two projected lane lines 511 and 512 in the top-view lane image 510 in FIG. 5A are adjusted parallel to the central line 510C. In the present embodiment, the second rotation correction matrix may be the matrix in the following Equation (6), where $r_0^B$ to $r_8^B$ are rotation parameters and $t_0^B$ to $t_2^B$ are displacement parameters.

$$\begin{bmatrix} r_0^B & r_1^B & r_2^B & t_0^B \\ r_3^B & r_4^B & r_5^B & t_1^B \\ r_6^B & r_7^B & r_8^B & t_2^B \\ 0 & 0 & 0 & 1 \end{bmatrix} \quad \text{Equation (6)}$$

In the present embodiment, the processor 110 may be configured to perform iterative operations in correspondence to an optimization function for the second rotation correction matrix, and the target of the optimization function is to minimize an angle between the two projected vectors 511P and 512P of the two projected lane lines 511 and 512 and the central line 510C (i.e., to make the projected vectors parallel to the Y-axis and perpendicular to the X-axis). For example, the processor 110 may establish a minimization equation as the following Equation (7), where vc and vd are unit vectors for the two projected vectors 511P and 512P of the two projected lane lines 511 and 512, while (1.0,0.0,0.0) is a unit vector. The processor 110 adjusts the extrinsic parameter matrix in the above Equation (5) using the above Equation (6), so as to establish the following Equation (8).

$$\min\left(\left(\frac{vc+vd}{2}\right) \cdot \overline{(1.0, 0.0, 0.0,)}\right)^2 \quad \text{Equation (7)}$$

$$\begin{bmatrix} x' \\ y' \\ z' \\ 1 \end{bmatrix} = \begin{bmatrix} r_0^B & r_1^B & r_2^B & t_0^B \\ r_3^B & r_4^B & r_5^B & t_1^B \\ r_6^B & r_7^B & r_8^B & t_2^B \\ 0 & 0 & 0 & 1 \end{bmatrix} \begin{bmatrix} r_0^A & r_1^A & r_2^A & t_0^A \\ r_3^A & r_4^A & r_5^A & t_1^A \\ r_6^A & r_7^A & r_8^A & t_2^A \\ 0 & 0 & 0 & 1 \end{bmatrix} \begin{bmatrix} r_0 & r_1 & r_2 & t_0 \\ r_3 & r_4 & r_5 & t_1 \\ r_6 & r_7 & r_8 & t_2 \\ 0 & 0 & 0 & 1 \end{bmatrix} \begin{bmatrix} X \\ Y \\ Z \\ 1 \end{bmatrix} \quad \text{Equation (8)}$$

In the present embodiment, since the purpose of the second rotation correction matrix is to adjust physical quantities of rotation, the displacement parameters $t_0^B$ to $t_2^B$ are all zero. With the coordinates of respective two terminal points of the two lane lines 311 and 312 known in FIG. 3A and the Equations (2), (7) and (8), the processor 110 may calculate the rotation parameters $r_0^B$ to $r_8^B$ iteratively. In an embodiment, the processor 110 may use existing mathematical optimization software with the least square method, such as the Ceres Solver, for the iterative calculations; but the present disclosure is not limited to this. The processor 110 may also obtain the rotation parameters with other numerical methods. By this, after the top-view lane image 510 in FIG. 5A has been corrected by the second rotation correction matrix with the calculated rotation parameters, a top-view lane image 520 as shown in FIG. 5B may be rendered, where the two projected lane lines 521 and 522 in the top-view lane image 520 are parallel to each other and respectively parallel to the central line 520C (with an angle of zero); but the distance between the two projected lane lines 521 and 522 may not meet a preset value, and the respective distances to the central line 520C from the projected lane lines 521 and 522 may not be the same.

At the steps S430, the processor 110 may calculate the displacement correction matrix so as to make the distance between the above two projected lane lines 521 and 522 in the top-view lane image 520 in FIG. 5B meet the preset value (e.g., of a normal width between lane lines of 3.5 to 4.5 meters) (i.e. correcting the Z-axis coordinate value for the onboard camera 120), and optionally to make the two projected lane lines 521 and 522 of equal distance to the central line 520C. In the present embodiment, the displacement correction matrix may be the matrix in the following Equation (9), where $r_0^C$ to $r_8^C$ are rotation parameters and $t_0^C$ to $t_2^C$ are displacement parameters.

$$\begin{bmatrix} r_0^C & r_1^C & r_2^C & t_0^C \\ r_3^C & r_4^C & r_5^C & t_1^C \\ r_6^C & r_7^C & r_8^C & t_2^C \\ 0 & 0 & 0 & 1 \end{bmatrix} \quad \text{Equation (9)}$$

In the present embodiment, the processor 110 may be configured to perform iterative operations in correspondence to an optimization function for the displacement correction matrix. In an embodiment, if a height parameter (i.e., a distance from a predetermined position of the onboard camera 120 on the vehicle to the ground, which is also the Z-axis coordinate value of the onboard camera) is input from outside, the target of the optimization function is to make the Z-axis coordinate value to be the height parameter, and optionally to make the central line 520C positioned at the center between the two projected lane lines 521 and 522. For example, the processor 110 may establish minimization equations as the following Equations (10) and (10a), where the y is the height parameter input from outside by a user, $X_1$ is the X-axis coordinate value of the projected lane line 521, and $X_2$ is the X-axis coordinate value of the projected lane line 522 (with the origin of the X-axis positioned on the central line 520C). The processor 110 adjusts the extrinsic parameter matrix in the above Equation (8) using the above Equation (9), so as to establish the following Equation (11).

$$\min(\gamma - Z)^2 \quad \text{Equation (10)}$$

$$\min(|X_1 + X_2|)^2 \quad \text{Equation (10a)}$$

$$\begin{bmatrix} x' \\ y' \\ z' \\ 1 \end{bmatrix} = \begin{bmatrix} r_0^C & r_1^C & r_2^C & t_0^C \\ r_3^C & r_4^C & r_5^C & t_1^C \\ r_6^C & r_7^C & r_8^C & t_2^C \\ 0 & 0 & 0 & 1 \end{bmatrix} \begin{bmatrix} r_0^B & r_1^B & r_2^B & t_0^B \\ r_3^B & r_4^B & r_5^B & t_1^B \\ r_6^B & r_7^B & r_8^B & t_2^B \\ 0 & 0 & 0 & 1 \end{bmatrix} \quad \text{Equation (11)}$$

$$\begin{bmatrix} r_0^A & r_1^A & r_2^A & t_0^A \\ r_3^A & r_4^A & r_5^A & t_1^A \\ r_6^A & r_7^A & r_8^A & t_2^A \\ 0 & 0 & 0 & 1 \end{bmatrix} \begin{bmatrix} r_0 & r_1 & r_2 & t_0 \\ r_3 & r_4 & r_5 & t_1 \\ r_6 & r_7 & r_8 & t_2 \\ 0 & 0 & 0 & 1 \end{bmatrix} \begin{bmatrix} X \\ Y \\ Z \\ 1 \end{bmatrix}$$

In the present embodiment, since the purpose of the displacement correction matrix is to adjust physical quantities of displacement, the rotation parameters $r_0^C$ to $r_8^C$ are all zero. With the coordinates of respective two terminal points of the two lane lines 311 and 312 known in FIG. 3A and the Equation (2), Equation (10) (and optionally with Equation (10a)) and Equation (11), the processor 110 may calculate the displacement parameters $t_0^C$ to $t_2^C$ iteratively. In an embodiment, the processor 110 may use existing mathematical optimization software with the least square method, such as the Ceres Solver, for the iterative calculations; but the present disclosure is not limited to this. The processor 110 may also obtain the displacement parameters with other numerical methods. By this, after the top-view lane image 520 in FIG. 5B has been corrected by the displacement correction matrix with the calculated displacement parameters, a top-view lane image 530 as shown in FIG. 5C may be rendered. The two projected lane lines 531 and 532 in the top-view lane image 530 are parallel to each other and respectively parallel to the central line 530C (with an angle of zero); wherein the distance from the onboard camera 120 to the ground meets the height parameter (which means the distance between the two projected lane line 531 and 532 meets the preset value), and optionally their respective distances to the central line 530C are the same.

However, in another embodiment, if the height parameter (i.e., a distance from the predetermined position of the onboard camera 120 on the vehicle to the ground) is not input from outside, the target of the optimization function is to make the distance between the two projected lane lines 521 and 522 meet the preset value N (N may be for example a numerical value ranging from 3.5 to 4.5 meters), and optionally to make the central line 520C positioned at the center between the two projected lane lines 521 and 522. For example, the processor 110 may establish a minimization equation as the following Equation (12). The processor 110 adjusts the extrinsic parameter matrix in the above Equation (8) using the above Equation (11), so as to establish the following Equation (13).

$$\min(N - |X_1 - X_2|)^2 \quad \text{Equation (12)}$$

$$\begin{bmatrix} x' \\ y' \\ z' \\ 1 \end{bmatrix} = \begin{bmatrix} r_0^C & r_1^C & r_2^C & t_0^C \\ r_3^C & r_4^C & r_5^C & t_1^C \\ r_6^C & r_7^C & r_8^C & t_2^C \\ 0 & 0 & 0 & 1 \end{bmatrix} \begin{bmatrix} r_0^B & r_1^B & r_2^B & t_0^B \\ r_3^B & r_4^B & r_5^B & t_1^B \\ r_6^B & r_7^B & r_8^B & t_2^B \\ 0 & 0 & 0 & 1 \end{bmatrix} \quad \text{Equation (13)}$$

$$\begin{bmatrix} r_0^A & r_1^A & r_2^A & t_0^A \\ r_3^A & r_4^A & r_5^A & t_1^A \\ r_6^A & r_7^A & r_8^A & t_2^A \\ 0 & 0 & 0 & 1 \end{bmatrix} \begin{bmatrix} r_0 & r_1 & r_2 & t_0 \\ r_3 & r_4 & r_5 & t_1 \\ r_6 & r_7 & r_8 & t_2 \\ 0 & 0 & 0 & 1 \end{bmatrix} \begin{bmatrix} X \\ Y \\ Z \\ 1 \end{bmatrix}$$

In the present embodiment, since the purpose of the displacement correction matrix is to adjust physical quantities of displacement, the rotation parameters $r_0^C$ to $r_8^C$ are all zero. With the coordinates of respective two terminal points of the two lane lines 311 and 312 known in FIG. 3A and the Equation (2), Equation (12) (and optionally with Equation (10a)) and Equation (13), the processor 110 may calculate the displacement parameters $t_0^C$ to $t_2^C$ iteratively. In an embodiment, the processor 110 may use existing mathematical optimization software with the least square method, such as the Ceres Solver, for the iterative calculations; but the present disclosure is not limited to this. The processor 110 may also obtain the displacement parameters with other numerical methods. By this, after the top-view lane image 520 in FIG. 5B has been corrected by the displacement correction matrix with the calculated displacement parameters, a top-view lane image 530 as shown in FIG. 5C may be rendered. The two projected lane lines 531 and 532 in the top-view lane image 530 are parallel to each other and respectively parallel to the central line 530C (with an angle of zero); wherein the distance between the two projected lane lines 531 and 532 meets the preset value, and optionally their respective distances to the central line 530C are the same. In another embodiment, if the onboard camera 120 has already been set at the center of the vehicle body, or if the user does not require that the lane lines must be of equal distance to the central line, the above optimization step for making the central line 520C positioned at the center between the two projected lane lines 521 and 522 may not be performed; that is, the processor 110 may not calculate the minimization equation of the Equation (10a).

Therefore, at the step S240 in FIG. 2, the processor 110 of the onboard camera device 100 may calculate the first rotation correction matrix as given in the above Equation (3), the second rotation correction matrix in the Equation (6) and the displacement correction matrix in the Equation (9) with regard to a current lane image obtained by the onboard camera 120 in real time; and the processor 110 may perform matrix multiplication operations on the above three correction matrices sequentially with the initial extrinsic parameter matrix $M_{ext}$ in the above Equation (1), to generate a new extrinsic parameter matrix for replacing the original initial extrinsic parameter matrix in Equation (1). Also, the processor 110 may obtain a next lane image by the onboard camera 120 according to the new extrinsic parameter matrix. In other embodiments, only one or any two of the first rotation correction matrix, the second rotation correction matrix and the displacement correction matrix may be calculated as needed to generate the new extrinsic parameter matrix, while correspondingly the respective correction modules in the image correction module 132 may be omitted as required. For example, if the distance between the lane lines is not quite important for the user, then the calculation of the displacement correction matrix may be omitted.

Figure 6:
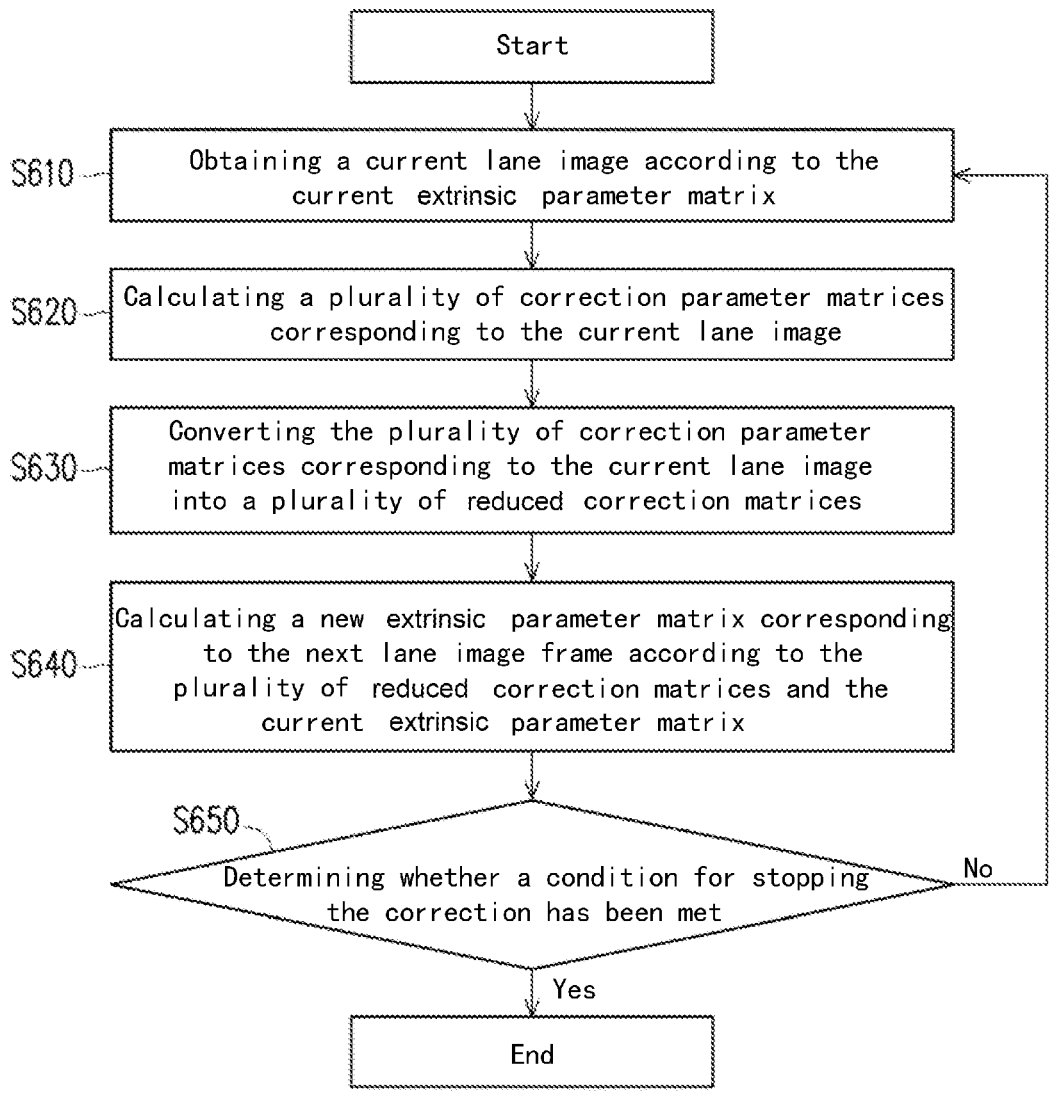
FIG. 6 is a flow chart of an automatic correction method for onboard camera according to another embodiment of the present disclosure.

FIG. 6 is a flow chart of an automatic correction method for onboard camera according to another embodiment of the present disclosure. Referring to FIGS. 1 and 6, the onboard camera device 100 may perform the steps S610 to S650 of the embodiment in FIG. 6 for dynamic automatic correction on the onboard camera. At step S610, the onboard camera device 100 obtains a current lane image by the onboard camera 120 with the current extrinsic parameter matrix. At step S620, the processor 110 calculates a plurality of correction parameter matrices corresponding to the current lane image. In the present embodiment, the processor 110 may perform the calculations for the first rotation correction matrix, the second rotation correction matrix and the displacement correction matrix as given above in the embodiment in FIG. 4. At step S630, the processor 110 converts the plurality of correction parameter matrices corresponding to the current lane image into a plurality of reduced correction matrices. As the vehicle may not always travel straightly at the center between the lane lines, in the present embodiment the current extrinsic parameter matrix will not be multiplied directly with the respective correction parameter matrices for the extrinsic parameter matrix for the next frame; instead, physical quantities corresponding to the above-mentioned correction parameter matrices will be multiplied with a corresponding scale value before being used for adjusting the extrinsic parameter matrix. In other words, in the present embodiment the adjustment may be performed gradually. For a displacement correction matrix, the physical quantities to be adjusted are amounts of displacement on the X, Y and Z-axes corresponding to $t_0$ to $t_2$. For a rotation correction matrix, the direction and angle to be rotated cannot be obtained directly; therefore the physical quantities to be adjusted by the first rotation correction matrix and the second rotation correction matrix are actually rotation vectors corresponding to 3×3 sub-matrices of $r_0$ to $r_8$, with the direction of the rotation vector being the rotation axis and the length of the rotation vector being the angle of rotation.

In the present embodiment, the processor 110 may convert a rotation parameter sub-matrix in each of the first and the second rotation correction matrices into a rotation vector by the Rodrigues' rotation formula, multiply the rotation vector by the scale value, and then convert it reversely to obtain a corresponding reduced correction matrix. In particular, the processor 110 may convert a 3×3 rotation parameter sub-matrix of $r_0$ to $r_8$ in the first rotation correction matrix or the second rotation correction matrix into a 3×1 rotation vector and multiply the rotation vector by a scale value (which is equivalent to decreasing the angle of rotation thereof), and then convert it reversely into a 3×3 reduced rotation parameter sub-matrix of $r'_0$ to $r'_8$ for replacing the original 3×3 rotation parameter sub-matrix of $r_0$ to $r_8$ in the first rotation correction matrix or the second rotation correction matrix, so as to obtain a corresponding reduced correction matrix. The processor 110 may multiply a displacement parameter sub-matrix in the displacement correction matrix by a scale value for a corresponding reduced correction matrix. In particular, the processor 110 may multiply the 3×1 displacement parameter sub-matrix of $t_0$ to $t_2$ in the displacement correction matrix by a scale value (which is equivalent to reducing the amount of displacement thereof) to get a reduced displacement parameter sub-matrix $t'_0$ to $t'_2$ for replacing the original 3×1 displacement parameter sub-matrix of $t_0$ to $t_2$ in the displacement correction matrix, so as to obtain a corresponding reduced correction matrix. It should be noted that, the scale values corresponding to the respective corrections parameter matrices may be the same or different, and scale values corresponding to different lane image frames may be fixed values or dynamic values, with the scale values ranging from 0 to 1. In an embodiment, the scale values may be, for example, a fixed value like 0.01. In another embodiment, the scale value may be, for example, dynamic values; and the processor 110 may set a relatively large scale value in accordance with that after being adjusted for multiple preceding lane image frames, the physical quantities to be adjusted tend to be smaller in the current lane image frame (which means that the trend of adjustments on the corresponding physical quantities by the correction parameter matrices in the multiple preceding frames is relatively reliable). In contrary, the processor 110 may set a relatively small scale value in accordance with that after being adjusted for multiple preceding lane image frames, the physical quantities to be adjusted tend to be larger in the current lane image frame (which means that the trend of adjustments on the corresponding physical quantities by the correction parameter matrices in the multiple preceding frames is relatively unreliable).

At step S640, the processor may calculate a new extrinsic parameter matrix corresponding to the next lane image frame according to the plurality of reduced correction matrices and the current extrinsic parameter matrix, which is similar to the matrix multiplication operations performed on the above plurality of reduced correction matrices sequentially with the current extrinsic parameter matrix in the above step S240, so as to generate a new extrinsic parameter matrix for replacing the original current extrinsic parameter matrix. At step S650, the processor 110 determines whether a condition for stopping the correction has been met. If the condition has not been met, the processor 110 performs the step S610 again to obtain the next lane image frame according to the new extrinsic parameter matrix and continue with the correction. In the present embodiment, the correction may be performed every other or multiple frames. If the condition has been met, the processor 110 terminates the automatic correction and results in a final extrinsic parameter matrix, which will be used continuously in all the following lane image frames. In other words, as the vehicle may not always travel straightly at the center of the lane, the processor may calculate the respective first rotation correction matrices, second rotation correction matrices and displacement correction matrices for the lane images obtained consecutively during the travel of the vehicle, multiply the degrees of adjustments by specific scale values in a successive manner, to have the extrinsic parameter matrix adjusted gradually. In other embodiments, the dynamic automatic correction may be paused when the processor 110 detects that the vehicle is stopped (e.g., by receiving a signal transmitted from a velocity sensor of the vehicle using a controller area network bus, a CAN bus), and be continued when the processor 110 detects that the vehicle continues to travel.

It should be noted that, the condition for stopping the correction may refer to, for example, that a preset number of lane image frames (for example, 50000 frames) have been adjusted, the overall correction time exceeds a preset length of time (for example, 10 minutes), the number of iterations for adjustment exceeds a preset number of iterations (for example, 50000 times), the differences in a physical quantity to be adjusted with the first rotation correction matrix, the second rotation correction matrix and the displacement correction matrix corresponding to the current lane image and the physical quantity to be adjusted with the respective correction matrices corresponding a preceding image is less than 0.1, and the likes; but the present disclosure is not limited to this.

In summary, the automatic correction method for onboard camera and the onboard camera device of the present disclosure may be applied to situations where the vehicle is stationary or travelling for automatic correction on the extrinsic parameter matrix of the onboard camera. The present disclosure may calculate a first rotation correction matrix, a second rotation correction matrix and a displacement correction matrix for the current extrinsic parameter matrix corresponding to the current lane image, and generate a new extrinsic parameter matrix for effective correction on the onboard camera. In addition, the present disclosure may also perform a dynamic correction for multiple consecutive lane images, wherein the amount of adjustment for the plurality of correction matrices calculated for each lane image may be accumulated proportionally, so as to adjust the images captured by the onboard camera gradually to increase the accuracy of its correction.

Although preferred embodiments of the present disclosure have been described above, it will be appreciated that the present disclosure is not limited to the disclosed embodiments. A number of variations and modifications may occur to those skilled in the art without departing from the scopes of the described embodiments. Therefore, it is intended that the scope of protection of the present disclosure is defined by the appended claims.

The invention claimed is:

1. An automatic correction method for onboard camera, comprising:
    obtaining a lane image with the onboard camera and a current extrinsic parameter matrix, and identifying two lane lines in the lane image;
    converting the lane image into a top-view lane image, and obtaining two projected lane lines in the top-view lane image for the two lane lines;
    calculating a plurality of correction parameter matrices corresponding to the current extrinsic parameter matrix according to the two projected lane lines; and
    correcting the current extrinsic parameter matrix according to the plurality of correction parameter matrices.

2. The automatic correction method according to claim 1, wherein the plurality of correction parameter matrices comprises a first rotation correction matrix, and calculating the plurality of correction parameter matrices corresponding to the current extrinsic parameter matrix according to the two projected lane lines comprises:
    calculating the first rotation correction matrix so that the two projected lane lines in the top-view lane image are adjusted parallel to each other.

3. The automatic correction method according to claim 2, wherein calculating the first rotation correction matrix comprises:
    calculating the first rotation correction matrix by a first optimization function, wherein a target of the first optimization function is to minimize an angle between the two projected lane lines.

4. The automatic correction method according to claim 1, wherein the plurality of correction parameter matrices comprises a second rotation correction matrix, and calculating the plurality of correction parameter matrices corresponding to the current extrinsic parameter matrix according to the two projected lane lines comprises:
    calculating the second rotation correction matrix so that the two projected lane lines in the top-view lane image are adjusted parallel to a central line.

5. The automatic correction method according to claim 4, wherein calculating the second rotation correction matrix comprises:
    calculating the second rotation correction matrix by a second optimization function, wherein a target of the second optimization function is to minimize an angle between the two projected lane lines and the central line.

6. The automatic correction method according to claim 1, wherein the plurality of correction parameter matrices comprises a displacement correction matrix, and calculating the plurality of correction parameter matrices corresponding to the current extrinsic parameter matrix according to the two projected lane lines comprises:
    calculating the displacement correction matrix so that a distance between the two projected lane lines in the top-view lane image are adjusted to a preset value.

7. The automatic correction method according to claim 6, wherein calculating the displacement correction matrix comprises:
    calculating the displacement correction matrix by a third optimization function,
    wherein, if a height parameter is input, a target of the third optimization function is to make a distance in Z-axis direction between the onboard camera and the two projected lane lines to be the height parameter, and
    if the height parameter is not input, a target of the third optimization function is to make a distance between the two projected lane lines to be a preset distance.

8. The automatic correction method according to claim 1, further comprising:
    converting the plurality of correction parameter matrices corresponding to the lane image into a plurality of reduced correction matrices respectively; and calculating a new extrinsic parameter matrix corresponding to a next lane image according to the plurality of reduced correction matrices and the current extrinsic parameter matrix.

9. The automatic correction method according to claim 8, wherein converting the plurality of correction parameter matrices corresponding to the lane image into a plurality of reduced correction matrices respectively comprises:
   multiplying a displacement parameter sub-matrix of a displacement correction matrix of the correction parameter matrices by a scale value to obtain a corresponding reduced correction matrix.

10. The automatic correction method according to claim 8, wherein converting the plurality of correction parameter matrices corresponding to the lane image into a plurality of reduced correction matrices respectively comprises:
   converting a rotation parameter sub-matrix of a rotation correction matrix of the correction parameter matrices into a rotation vector;
   multiplying the rotation vector by a scale value; and
   converting the rotation vector multiplied by the scale value reversely into a corresponding reduced rotation parameter sub-matrix, to obtain a corresponding reduced correction matrix.

11. An onboard camera device, comprising:
   an onboard camera to obtain a lane image according to a current extrinsic parameter matrix;
   a processor coupled to the onboard camera; and
   a memory coupled to the processor and configured to store a plurality of modules for reading and execution by the processor,
   wherein the processor is configured to execute an image processing module to identify two lane lines in the lane image, and to convert the lane image into a top-view lane image, for obtaining two projected lane lines in the top-view lane image for the two lane lines; and
   the processor is further configured to execute an image correction module to calculate a plurality of correction parameter matrices corresponding to the current extrinsic parameter matrix according to the two projected lane lines, and to correct the current extrinsic parameter matrix according to the plurality of correction parameter matrices.

12. The onboard camera device according to claim 11, wherein the image correction module comprises a first rotation correction module, and the processor is further configured to execute the first rotation correction module to calculate a first rotation correction matrix of the plurality of correction parameter matrices so that the two projected lane lines in the top-view lane image are adjusted parallel to each other.

13. The onboard camera device according to claim 12, wherein the processor is further configured to calculate the first rotation correction matrix by a first optimization function, and a target of the first optimization function is to minimize an angle between the two projected lane lines.

14. The onboard camera device according to claim 11, wherein the image correction module comprises a second rotation correction module, and the processor is further configured to execute the second rotation correction module to calculate a second rotation correction matrix of the plurality of correction parameter matrices so that the two projected lane lines in the top-view lane image are adjusted parallel to a central line.

15. The onboard camera device according to claim 14, wherein the processor is further configured to calculate the second rotation correction matrix by a second optimization function, and a target of the second optimization function is to minimize an angle between the two projected lane lines and the central line.

16. The onboard camera device according to claim 11, wherein the image correction module comprises a displacement correction module, and the processor is further configured to execute the displacement correction module to calculate a displacement correction matrix of the plurality of correction parameter matrices so that a distance between the two projected lane lines in the top-view lane image are adjusted to a preset value.

17. The onboard camera device according to claim 16, wherein a third optimization function is used for calculating the displacement correction matrix,
   if a height parameter is input from, a target of the third optimization function is to make a distance in Z-axis direction between the onboard camera and the two projected lane lines to be the height parameter, and
   if the height parameter is not input, a target of the third optimization function is to make a distance between the two projected lane lines to be a preset distance.

18. The onboard camera device according to claim 11, wherein the processor is further configured to convert the plurality of correction parameter matrices corresponding to the lane image into a plurality of reduced correction matrices respectively; and
   the processor is further configured to calculate a new extrinsic parameter matrix corresponding to a next lane image according to the plurality of reduced correction matrices and the current extrinsic parameter matrix.

19. The onboard camera device according to claim 18, wherein the processor is further configured to multiply a displacement parameter sub-matrix of a displacement correction matrix of the correction parameter matrices by a scale value to obtain a corresponding reduced correction matrix.

20. The onboard camera device according to claim 18, wherein the processor is further configured to:
   convert a rotation parameter sub-matrix of a rotation correction matrix of the correction parameter matrices into a rotation vector;
   multiply the rotation vector by a scale value; and
   convert the rotation vector multiplied by the scale value reversely into a corresponding reduced rotation parameter sub-matrix, to obtain a corresponding reduced correction matrix.

* * * * *